United States Patent [19]

Windstey

[11] 4,367,956

[45] Jan. 11, 1983

[54] CLOCKWORK OF AN ELECTRIC QUARTZ CLOCK

[76] Inventor: Friedrich Windstey, Gerichtsgasse 1/5/7, A-1210 Wien, Austria

[21] Appl. No.: 180,086

[22] Filed: Aug. 21, 1980

[30] Foreign Application Priority Data

Jun. 30, 1980 [DE] Fed. Rep. of Germany ....... 3024702

[51] Int. Cl.[3] ........................ G04B 29/00; H04M 1/21

[52] U.S. Cl. ...................................... 368/88; 368/277; 368/278; 368/317

[58] Field of Search ................ 368/88, 277, 278, 279, 368/316, 317, 281-283, 299-301, 314, 280, 276

[56] References Cited

U.S. PATENT DOCUMENTS

| | | | |
|---|---|---|---|
| 2,635,415 | 4/1953 | Manson | 368/88 |
| 2,895,549 | 7/1959 | Gruber et al. | 368/278 |
| 3,977,176 | 8/1976 | Murakami et al. | 368/280 X |
| 3,979,900 | 9/1976 | Dörflinger et al. | 368/88 |

FOREIGN PATENT DOCUMENTS 352189 9/1979 Austria .

*Primary Examiner*—B. A. Reynolds
*Assistant Examiner*—Philip H. Leung
*Attorney, Agent, or Firm*—Karl F. Ross

[57] ABSTRACT

An electric quartz clock has a clockwork provided with a contact plate which forms a peripheral flange about a rear part of the clockwork, the outer periphery of the flange being engaged by detents which extend rearward from a clock housing whose front cover is provided with a viewing window. The periphery of the front cover carries several pushbuttons aligned with resilient contact members which overhang the flange of the contact plate and can be selectively pressed thereagainst to close a circuit for the control of the clockwork. The contact plate may be permanently secured to the body of the clockwork or may be attached thereto by coacting formations, specifically by lugs on the plate engaging the clockwork body or lugs on a surrounding annular element engaging the rim of a central aperture of the contact plate; the latter lugs could also hold an ancillary rear member such as a spacer ring or an end plate.

10 Claims, 12 Drawing Figures

CLOCKWORK OF AN ELECTRIC QUARTZ CLOCK

FIELD OF THE INVENTION

My present invention relates to an electric quartz clock, particularly one designed for being mounted in a dialing device of a signal-transmission system, comprising a clockwork arranged in a housing whose frontal cover plate has a sight glass and is penetrated by spring-mounted buttons. The latter can be actuated to press underlying contact members against a contact plate arranged at the rear of the clockwork, thereby closing an electric circuit for controlling the operation of the clockwork.

DESCRIPTION OF THE PRIOR ART

An electric quartz clock of this kind has, for example, already been described in Austrian Pat. No. 352,189. The clockwork there is embraced by an annular element received in the clock housing. The contact plate is formed by an enlarged head of a fastening screw through which the housing bottom can be secured to a dialing disk with finger holes in a peripheral portion projecting beyond the housing.

Dials or selectors of different construction have been used in telephones and other signal-transmission systems. Thus, the quartz clock described in the Austrian patent cannot be employed universally, as a suitable contact plate adapted to replace the fastening screw must be provided in each instance. Furthermore, some such devices do not have a fastening screw in a position where it could be replaced by the contact plate. All parts must, however, be firmly fixed to one another in order to prevent faulty contact.

OBJECT OF THE INVENTION

It is, therefore, the object of the present invention to provide an electric quartz clock capable of establishing a stable connection between the housing, the contact plate and the clockwork independently of the design or structure of the part receiving the clock so that it can be employed in many ways not restricted to signal-transmission systems.

SUMMARY OF THE INVENTION

In accordance with the present invention I provide a rear part of a generally cylindrical clockwork body with a contact plate having a radially projecting fastening flange releasably engaged by rearwardly extending retaining means on the housing for holding the clockwork in position.

With the aid of this peripheral fastening flange, the connection between the clockwork and the housing is obtained independently of structural limitations. The quartz clock can be mounted in a selector having a fastening screw for the dial in accordance with the Austrian patent, in which case that fastening screw need not be removed. The clock may further be employed in other dialing equipment and in a number of different ways, as will be described later on.

The contact plate may, for example, be made of an insulating material and form an enlarged bottom plate of the clockwork, the contact members electrically connected to the clockwork being fixed to the projecting fastening flange.

Alternatively, a conductor plate of the clockwork itself is enlarged to form the peripheral fastening flange.

As already mentioned, the above-described features of my invention allow a number of different uses independent of the location where the quartz clock is positioned. This is due to the fact that the housing, the contact plate and the clockwork form a compact unit. Such an assembly requires, however, a specially designed clockwork. In order to be able to turn conventional clockworks, which are available on the market and differ from one another in their diameters, into a quartz clock in accordance with the present invention, I prefer to provide the contact plate with coupling formations enabling its attachment to the clockwork.

Such a detachable contact plate is preferably a flat metallic ring integral with partly punched-out lugs hooked onto front and rear faces of the clockwork body. Thus, the same type of structure can be used for various clockworks with only a change in the shape of the contact ring whose outer diameter remains always the same. Hence, one and the same housing can be employed for all clockworks.

Alternatively, the coupling formations can be recesses in the contact plate engaging projecting catches formed on detents of the clockwork.

In certain cases, particularly when the diameter of the clockwork body is substantially smaller than usual, the clockwork may be embraced by an additional annular element carrying at least three detents provided with inwardly projecting catches engaging an ancillary member of the assembly on the rear of the contact plate.

In an advantageous construction this annular element has four detents or lugs, one detent having only an outwardly projecting catch, another detent having only an inwardly projecting catch and the remaining two detents each having both an outwardly and an inwardly projecting catch, the outwardly projecting catches engaging in recesses of the contact plate and the inwardly projecting catches engaging the aforementioned ancillary rear member.

The detents of the housing are preferably molded thereto in order to provide a simple connection between the fastening flange of the contact plate and the housing, their inwardly projecting catches engaging the outer rim of the ring or flange.

The projecting catches of the detents molded onto the housing could also engage an ancillary member to the rear of the contact plate, e.g. a piezo plate, a spacer ring, or a cover plate whose outer surface is provided with an adhesive layer.

The last-mentioned embodiment is particularly suitable for quartz clocks which are to be fixed, for example, to the dashboard of a motor vehicle or to an object lying on a desk.

BRIEF DESCRIPTION OF THE DRAWING

I shall now describe various embodiments of the present invention in greater detail with reference to the accompanying drawing in which.

SPECIFIC DESCRIPTION

Figure 1:
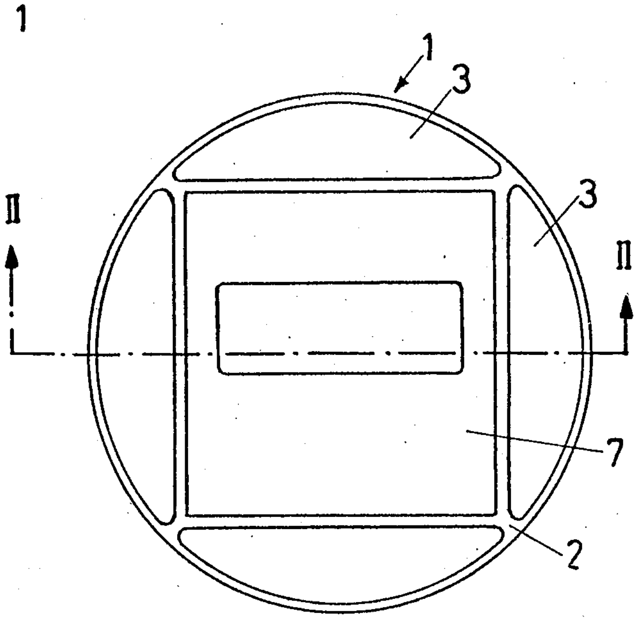
FIG. 1 is a top view of an electric quartz clock in accordance with the present invention.
Figure 2:
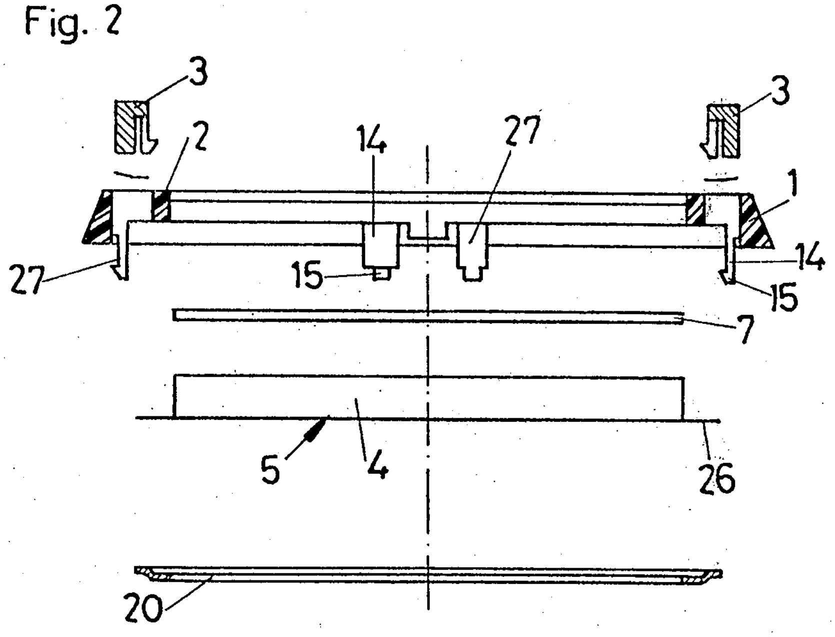
FIG. 2 is an exploded sectional view, taken on line II—II of FIG. 1, of the individual parts of the quartz clock.
Figure 3:
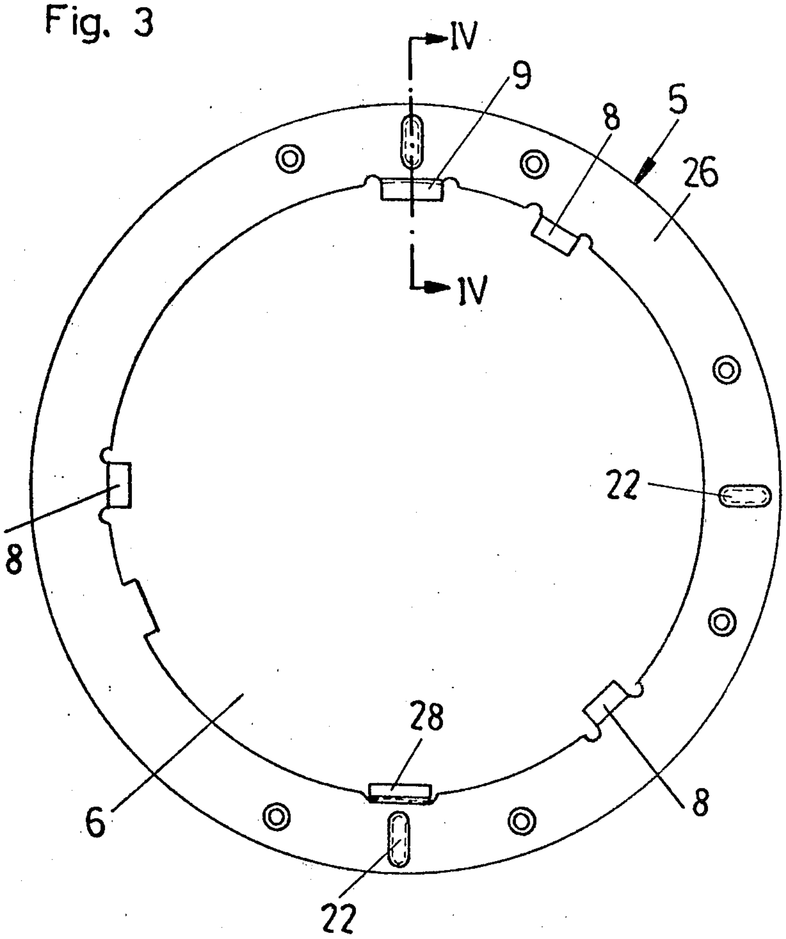
FIG. 3 shows an embodiment of a contact plate attachable to the clockwork.
Figure 4:
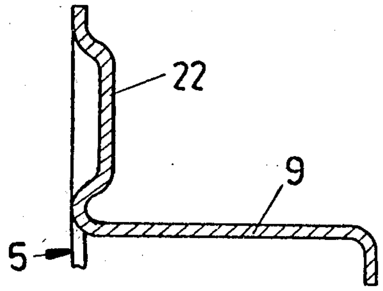
FIG. 4 is a sectional view taken along line IV—IV of FIG. 3.
Figure 5:
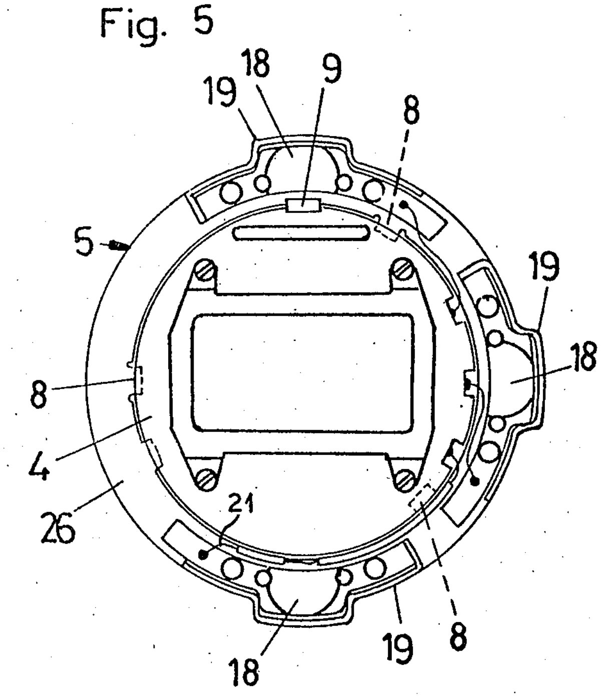
FIG. 5 is a top view of a clockwork having the contact plate of FIGS. 3 and 4 attached thereto.
Figure 6:
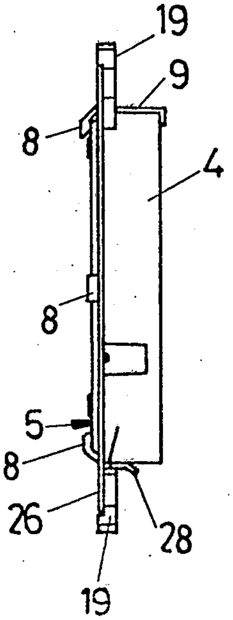
FIG. 6 is a side view of the assembly shown in FIG. 5.
Figure 7:
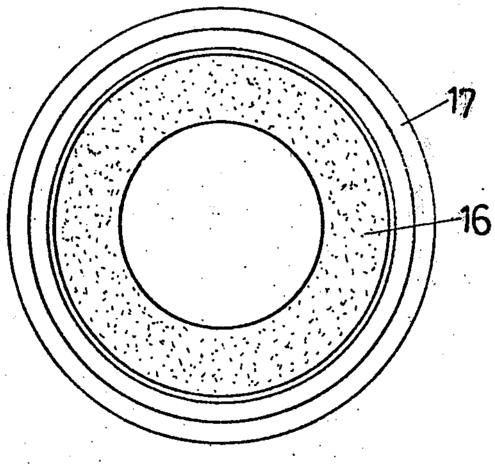
FIG. 7 is a bottom view of a rear cover plate.

FIGS. 1 and 2 show an electric quartz clock embodying the present invention, comprising a housing 1 with a square viewing window or sight glass 7 inserted into its frontal cover plate 2. Four pushbuttons 3 are spring-mounted in a peripheral zone of plate 2, i.e. in respective circle segments bounding the window area 7. A contact plate 5 has a fastening flange 26 projecting radially from a rear part of a generally cylindrical clockwork 4. Detents 14 axially projecting from housing 1 have inwardly pointing catches 15 which engage the rim of the fastening flange 26. The detents 14 further hold in position an ancillary rear member 20 of the clock assembly. When the quartz clock is, for example, mounted in the dial of a telephone, the member 20 can act as a spacer ring therefor. Ring 20 could be replaced by a cover plate 17, FIG. 7, provided with an adhesive layer 16 by which the assembly can be secured to a variety of objects. As the housing 1 and the cover plate 17 are preferably circular, the clock can easily be rotated into the correct position after the cover plate 17 has already been glued to a base.

Further detents 27 with outwardly projecting catches are arranged on the housing 1. These detents 27 retain a compensating ring which has not been illustrated and may form a lower or rear termination for the housing.

In the embodiment of FIGS. 3–6, contact plate 5 is essentially a circular ring which forms the fastening flange 26 and carries rearwardly and forwardly projecting lugs 8 and 9 serving to retain the clockwork 4 in its opening 6. As can be seen from FIGS. 5 and 6, lugs 8 and 9 respectively engage the bottom or rear face and the cover or front face of the clockwork. A further resilient lug 28 electrically connects a conductive area of the clockwork 4 to the metallic contact plate 5 and clamps the clockwork in position.

Insulating members 19 are fastened to the contact plate 5 as supports for three contact springs 18 electrically connected to the clockwork 4 via leads 21. By actuating the overlying pushbuttons 3, the contact springs 18 are pressed against the contact plate 5 and a control circuit is closed. As can be seen from FIGS. 3 and 4, surface deformations 22 rise from the contact plate 5 in the regions of springs 18 in order to reduce the actuating stroke of the pushbuttons.

Figure 8:
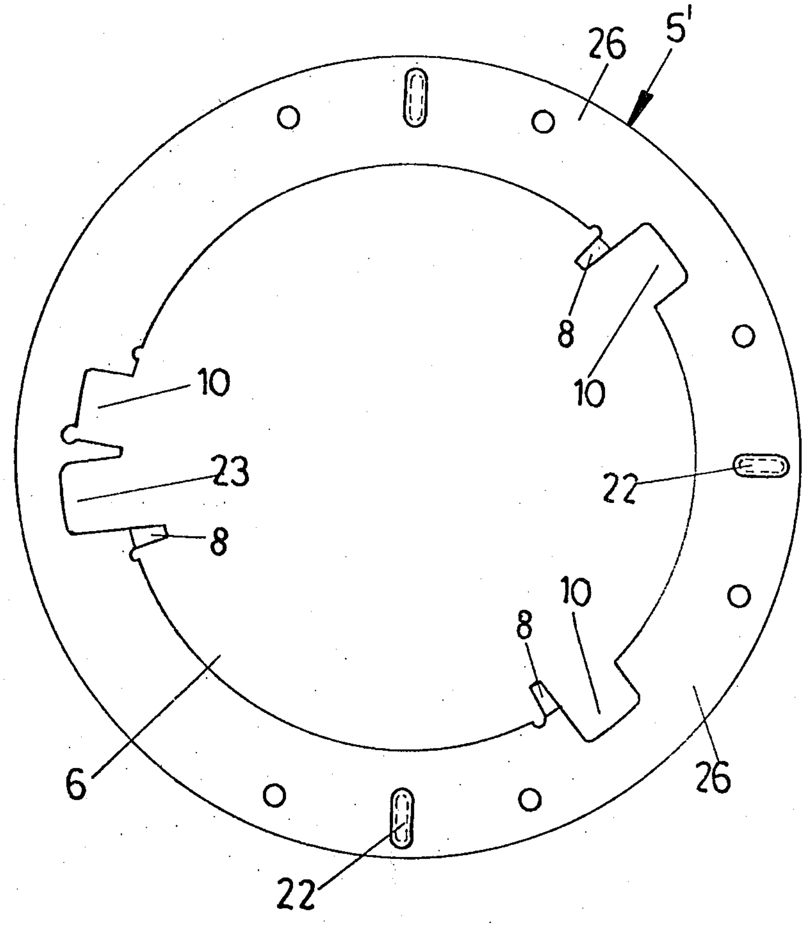
FIG. 8 shows a further embodiment of a contact plate attachable to the clockwork.
Figure 9:
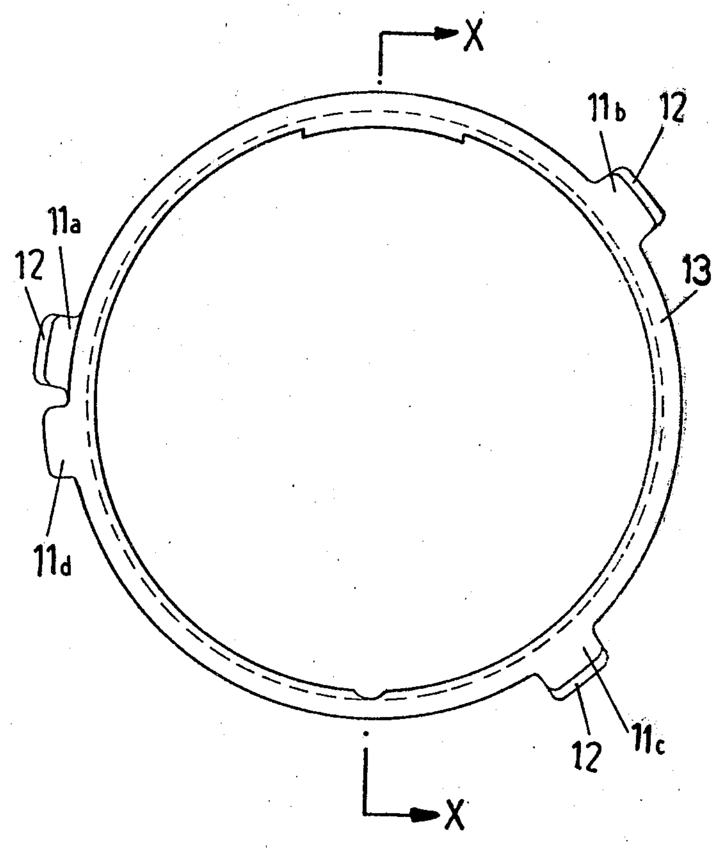
FIG. 9 shows an annular element adapted to be connected to the contact plate of FIG. 8.
Figure 10:
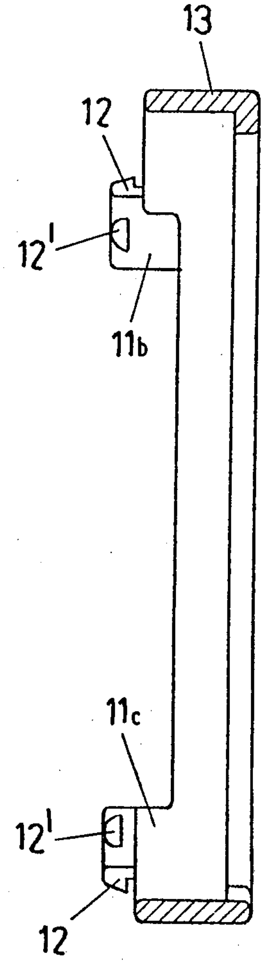
FIG. 10 is a sectional view taken along line X—X of FIG. 9.

FIG. 8 shows a modified circular contact plate 5′ provided with lugs 8 and recesses 10 for retaining the clockwork. Three detents or lugs 11*a*, 11*b*, 11*c* with radially outwardly projecting catches 12 on an annular element 13 (FIGS. 9–11) embracing the clockwork 4 coact with the recesses 10 and lugs 8. The clockwork 4 is, thus, firmly secured to the contact plate 5′.

Figure 11:
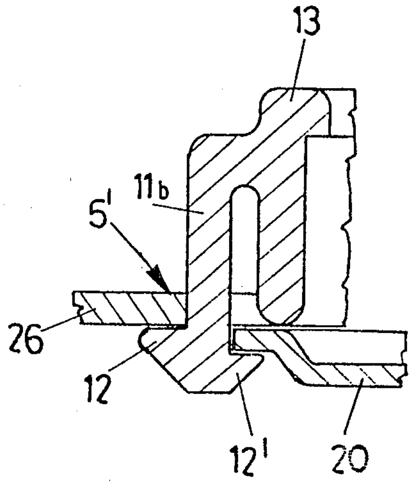
FIG. 11 is a sectional detail view of the annular element in the region of a detent.

As particularly illustrated in lug 11*b* in FIG. 11, three lugs 11*b*, 11*c*, 11*d* of the annular element 13 can also embrace an ancillary structural member of the clock assembly, here the spacer ring 20 of FIG. 2. That ring, however, could be replaced by a piezo plate or by an end plate with or without an adhesive layer such as the cover plate 17 of FIG. 7. As the lugs 11*b*, 11*c* can no longer engage the member 20 after having gripped the contact plate 5′, that plate is provided with a further recess 23 as illustrated in FIG. 8. Two lugs 11*b*, 11*c* formed on the annular element 13 are provided on opposite sides with outwardly projecting catches 12 for the contact plate 5′ and inwardly projecting catches 12′ for the rear member 20. The two further lugs 11*a*, 11*d*, lying next to each other, respectively have only an outwardly projecting catch 12 and only an inwardly projecting catch 12′. The lug 11*d* carrying only the inwardly projecting catch 12′ extends with clearance into the recess 23 of the contact plate 5′ so as to move into that recess when the rear member 20 is inserted.

Figure 12:
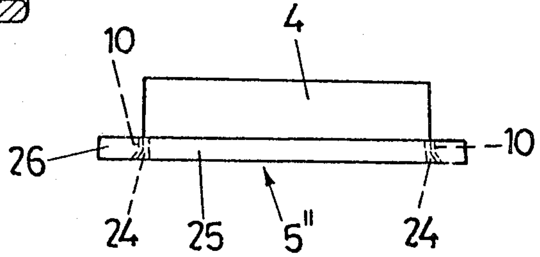
FIG. 12 is a side view, similar to FIG. 6, of a further embodiment in which the contact plate is formed by an enlarged conductor plate of the clockwork.

FIG. 12 shows a contact plate 5″ which constitutes a fixed component of the clockwork 4 and is formed by an enlarged bottom plate, preferably a conductor plate 25, with points of contact provided in the fastening flange 26. The remainder of the clockwork 4 can be linked thereto by means of detents 24, for example, engaging in recesses 10 of the contact plate 5″.

The last-described embodiment requires a specially designed clockwork insertable into the housing 1; the various ancillary members already mentioned (end plates with adhesive layer, spacer ring, compensating rings) may adapt the quartz clock to many different uses.

The embodiments of FIGS. 3–6 and 8–11 can be easily adapted to conventional clockworks, a stable connection between the clockwork and the housing being in any case obtained by means of the contact plate.

What is claimed is:

1. An electric quartz clock comprising:
   - a clockwork having a generally cylindrical body provided with a flat contact ring encompassing a rear part of said body;
   - a housing surrounding said clockwork and having a front cover provided with a viewing window, said housing being provided with a plurality of peripherally spaced rearwardly extending detents having inwardly pointing catches releasably engaging an outer rim of said contact ring for holding said clockwork centered in said housing;
   - coupling means on an inner rim of said contact ring releasably connecting same with said clockwork;
   - a plurality of pushbuttons disposed in a peripheral zone of said front cover overlying said contact ring; and
   - a plurality of resilient contact members connected to said clockwork and disposed above said contact ring for depression by respective pushbuttons into conductive engagement therewith to close respective control circuits.

2. A clock as defined in claim 1 wherein said rims are circular and centered on the axis of said body.

3. A clock as defined in claim 1 wherein said detents further engage an ancillary member disposed rearwardly of said contact ring.

4. A clock as defined in claim 1, 2 or 3 wherein said coupling means comprises forwardly and rearwardly projecting lugs respectively hooked onto front and rear faces of said body.

5. A clock as defined in claim 4 wherein said ring is metallic, said lugs being integral with said contact ring.

6. A clock as defined in claim 5 wherein said contact members are mounted on said contact ring through the intermediary of insulating supports, said contact ring having surface deformations projecting toward said contact members.

7. A clock as defined in claim 5 wherein said contact ring is electrically connected to said clockwork by a further lug in contact with a conductive area of said body.

8. A clock as defined in claim 3 wherein said ancillary member is a spacing ring.

9. A clock as defined in claim 3 wherein said ancillary member is a cover plate.

10. A clock as defined in claim 9 wherein said cover plate is provided with an adhesive surface layer.

* * * * *